(12) United States Patent
Getsch

(10) Patent No.: US 7,924,314 B2
(45) Date of Patent: Apr. 12, 2011

(54) BULK IMAGE GATHERING SYSTEM AND METHOD

(75) Inventor: Timothy E. Getsch, Redmond, WA (US)

(73) Assignee: Check Out My, LLC, Redmond, WA (US)

( * ) Notice: Subject to any disclaimer, the term of this patent is extended or adjusted under 35 U.S.C. 154(b) by 1107 days.

(21) Appl. No.: 11/669,772

(22) Filed: Jan. 31, 2007

(65) Prior Publication Data
US 2007/0186164 A1 Aug. 9, 2007

Related U.S. Application Data

(60) Provisional application No. 60/766,610, filed on Jan. 31, 2006.

(51) Int. Cl.
H04N 5/225 (2006.01)
G06F 3/00 (2006.01)
(52) U.S. Cl. .................... 348/207.99; 715/723
(58) Field of Classification Search .................. None
See application file for complete search history.

(56) References Cited

U.S. PATENT DOCUMENTS

| 6,160,640 | A  | * | 12/2000 | Ohmori ............... | 358/474 |
| 7,039,873 | B2 | * | 5/2006  | Morris et al. ......... | 715/748 |
| 7,090,131 | B2 | * | 8/2006  | Natsuno ............... | 235/449 |
| 2002/0055955 | A1 | * | 5/2002 | Lloyd-Jones et al. ... | 707/512 |

* cited by examiner

Primary Examiner — Luong T Nguyen
(74) Attorney, Agent, or Firm — Aeon Law; Adam L.K. Philipp

(57) ABSTRACT

A system and method for gathering bulk images are provided herein.

18 Claims, 7 Drawing Sheets

BULK IMAGE GATHERING SYSTEM AND METHOD

RELATED APPLICATIONS

This application is a non-provisional patent application claiming the benefit of U.S. Provisional Patent Application No. 60/766,610 entitled BULK IMAGE GATHERING SYSTEM AND METHOD with the named inventor Timothy Getsch, filed on Jan. 31, 2006, which is hereby incorporated in its entirety by reference.

FIELD

The present invention relates to the field of data capture. In particular, this invention relates to methods and systems for digitally capturing holder objects for use in storing, retrieving, cataloging, and identifying bulk captured images.

BACKGROUND

Sports cards, stamps, coins, photographs, photo slides, postcards, stickers, magazines, comic books, comic cards, playing cards, trading cards, gaming cards, "pogs," or the like lend themselves well to gathering images in bulk. These items may be stored individually without protection or with protective sheets, cases, holders or the like. It is also common to store such items in pages, books, or the like. Storing them in groups of multiple items may improve the ability to gather images in bulk. Some examples of common ways that items may be stored are: sports cards may be stored in 9 pocket pages, 12 pocket pages, 15 pocket pages, 4 pocket pages, 6 pocket pages, 8 pocket pages, or the like; coins may be stored in 12 pocket pages, 20 pocket pages, coin books, or the like; books and comic books may be stored in pocket sleeves or the like.

There are many technologies for getting digital images (e.g., scanner, digital camera, video camera, web camera, etc.). These technologies produce sets of images. These technologies may be used to capture digital images of items such as sports cards, stamps, coins, photographs, and the like. In many cases, these digital image-capturing technologies are capable of capturing multiple items in a single image. However, it is often desirable to split the captured digital image into separate sub-images; often one of each individual item. To accomplish this task, some tools such as digital image manipulation software may be used to split each individual image out of the larger image.

Once images are split, the images may be given meaningful names, and it is common to associate additional data with each of the individual images. To make matters more complicated, it is often desirable to capture the backsides of the items captured in the image as well, and to maintain the association between the front and the back of each individual item that is in the set of items. Altogether, this process is tedious, time consuming, and error prone.

DETAILED DESCRIPTION

Figure 1:
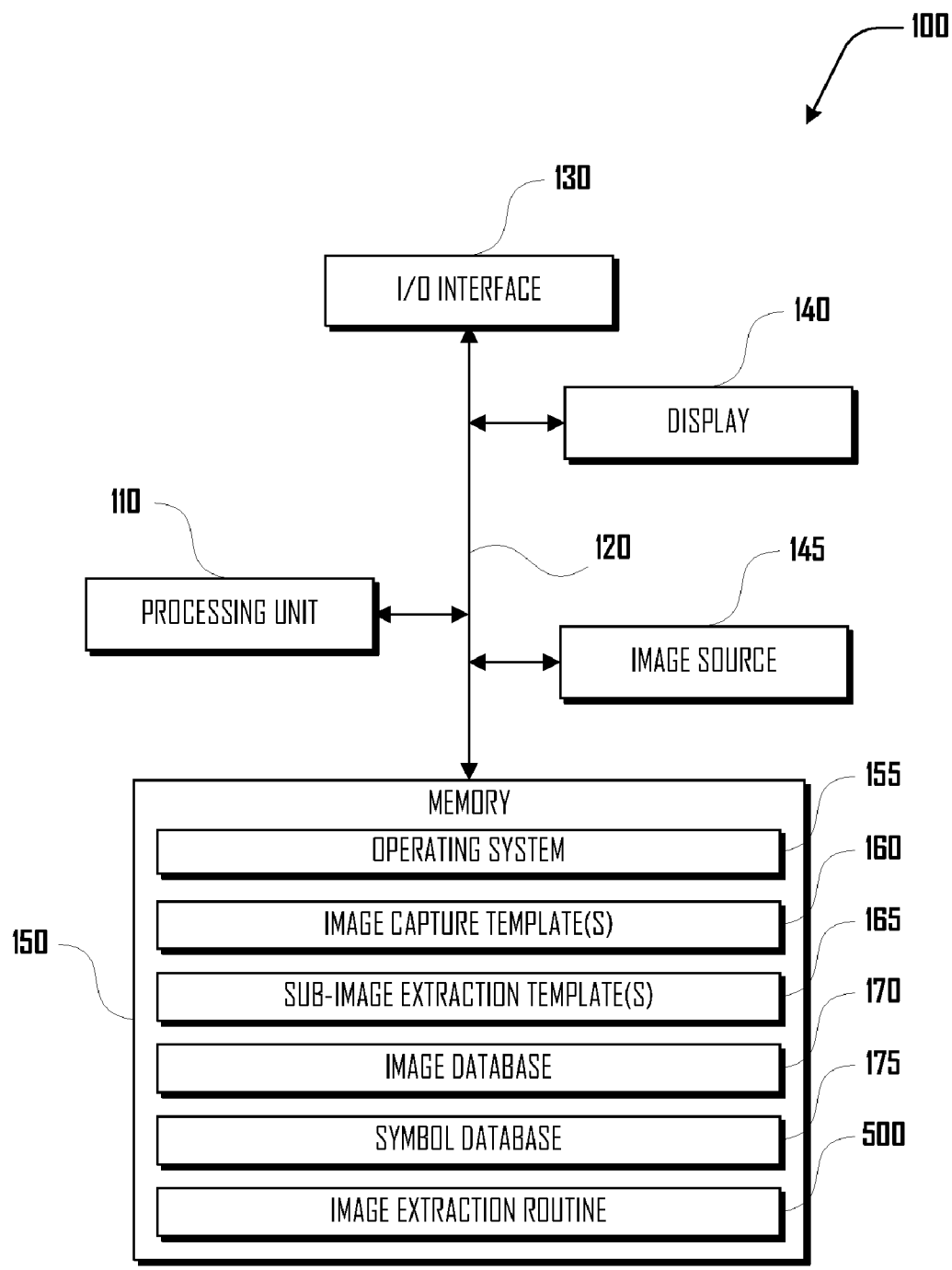
FIG. 1 is a representation of an example user device suitable for use in various embodiments.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file Servers, computer Servers and memory storage devices. Each of these conventional distributed computing components is accessible by the processor via a communication network.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. Those of ordinary skill in the art will appreciate that other embodiments, including additional devices, or combinations of illustrated devices, may be added to, or combined, without limiting the scope to the embodiments disclosed herein.

In one exemplary embodiment of gathering images in bulk, a system (including a computer, one or more scanners and a related software application) was developed. See FIGS. 3-4 for example screenshots of one example implementation of such a software application. Other digital image capturing devices or computing devices could be used in other examples of this technology.

FIG. 1 illustrates several of the key components of the user device 100. In some embodiments, the user device 100 may include many more components than those shown in FIG. 1. However, it is not necessary that all of these generally conventional components be shown in order to disclose an illustrative embodiment. As shown in FIG. 1, the user device 100 includes an I/O interface 130 for connecting to other devices in the digital content registry system 100. In various embodiments, the I/O interface 130 includes the necessary circuitry for such a connection and is constructed for use with the appropriate protocol.

The user device 100 also includes a processing unit 110, a memory 150 and may include a display 140, an image source 145, all interconnected along with the I/O interface 130 via a bus 120. The memory 150 generally comprises a random access memory ("RAM"), a read only memory ("ROM"), and a permanent mass storage device, such as a disk drive. The memory 150 stores the program code necessary for image capture template(s) 160, sub-image extraction template(s) 165, image database 170, symbol database 175 and image extraction routine 500. In addition, the memory 150 also stores an operating system 155. It will be appreciated that these software components may be loaded from a computer readable medium into memory 150 of the user device 100 using a drive mechanism (not shown) associated with a computer readable medium, such as a floppy disc, tape, flash memory, DVD/CD-ROM drive or via the I/O interface 130.

Although an exemplary user device 100 has been described that generally conforms to conventional general purpose computing devices, those of ordinary skill in the art will appreciate that a user device 100 may be any of a great number of devices, such as a personal data assistant ("PDA"), scanner, camera, cellular phone or the like.

In various embodiments, the user can start gathering images based on a template sequence, the user can create a new template by training the software how to split up images and how to name them, or the user can create a template sequence by telling the software what set of templates should be used as a sequence.

In one exemplary embodiment, instructions are received to start gathering images. The system allows the user to insert sheets, pages, cases or other holder objects in a scanner (e.g., image capture device 145 or the like). Next, the system captures an image, splits the image into sub-images based on a sub-image extraction template 165 in a possible sequence of templates and names each of the sub-images (or otherwise associates identifying metadata with each sub-image). If the sub-image extraction template sequence defines a template for the back of the sheet or page, the user may then flip (either from side-to-side or from top-to-bottom, depending on the template, or automatically recognized by the system) the sheet or page, and the system captures another image. That image is split into sub-images based on the next sub-image extraction template in the sequence, and the images are named (or otherwise labeled) according to the information from that template. This process is described in further detail below with regard to FIGS. 5-7.

The naming/labeling conventions defined in the templates can generate an association between a front sub-image and a back sub-image (in the case of coins, collectable cards and other objects with two information-bearing sides), or they can keep the images unassociated (e.g., photographs or other single-sided objects). This process can then be repeated with additional sheets or pages. In some embodiments, the metadata (name, label or other information) includes specific information about the position of an object. In other embodiments, the metadata uses the position as at least part of the identifying information (e.g., the second card of the first row of the tenth sheet of objects).

Figure 2:
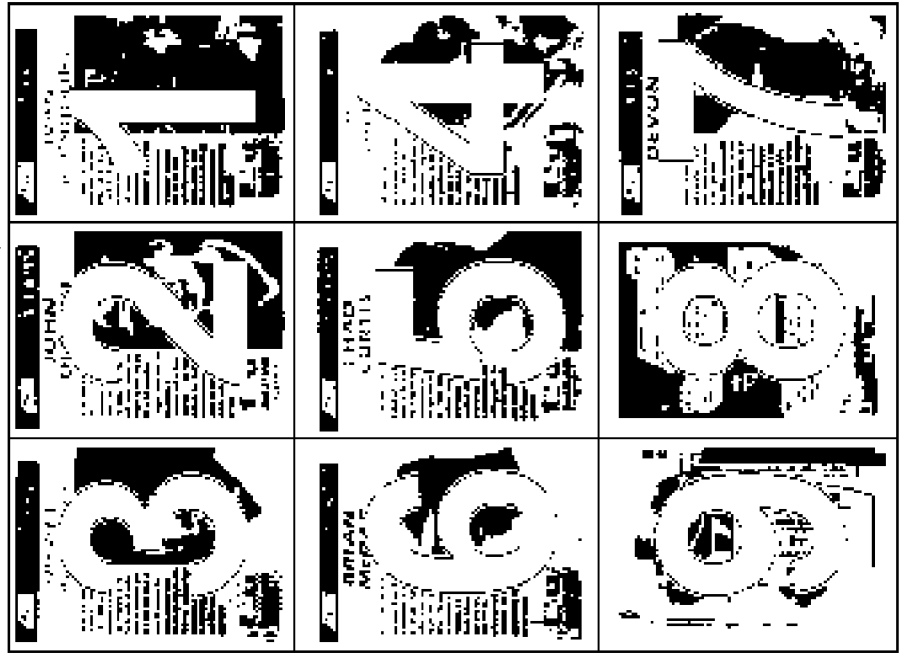
FIG. 2 is an example of a front and back image capture of a 9-pocket page of sports cards, in accordance with one embodiment.
Figure 2:
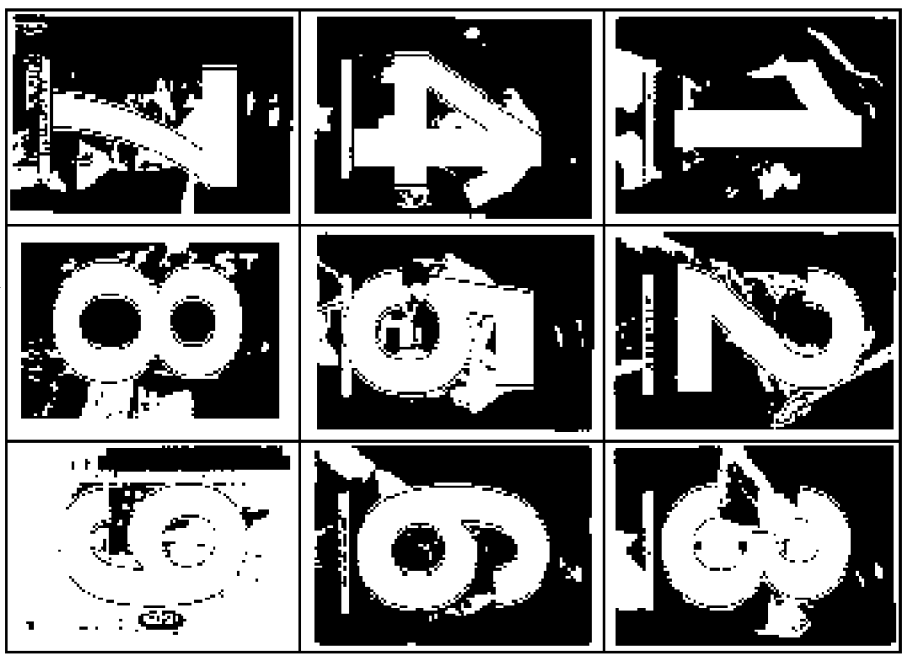

See FIG. 2 for an example of what happens when scanning the front and back of a 9-pocket page of sports cards. The top side 205 of the 9-pocket page displays a first side of each card held in a pocket (labeled 1-9). The bottom side 210 of the 9-pocket page displays a corresponding second side, when flipped vertically, of each card held in a pocket (with corresponding sides also labeled 1-9).

Figure 3:
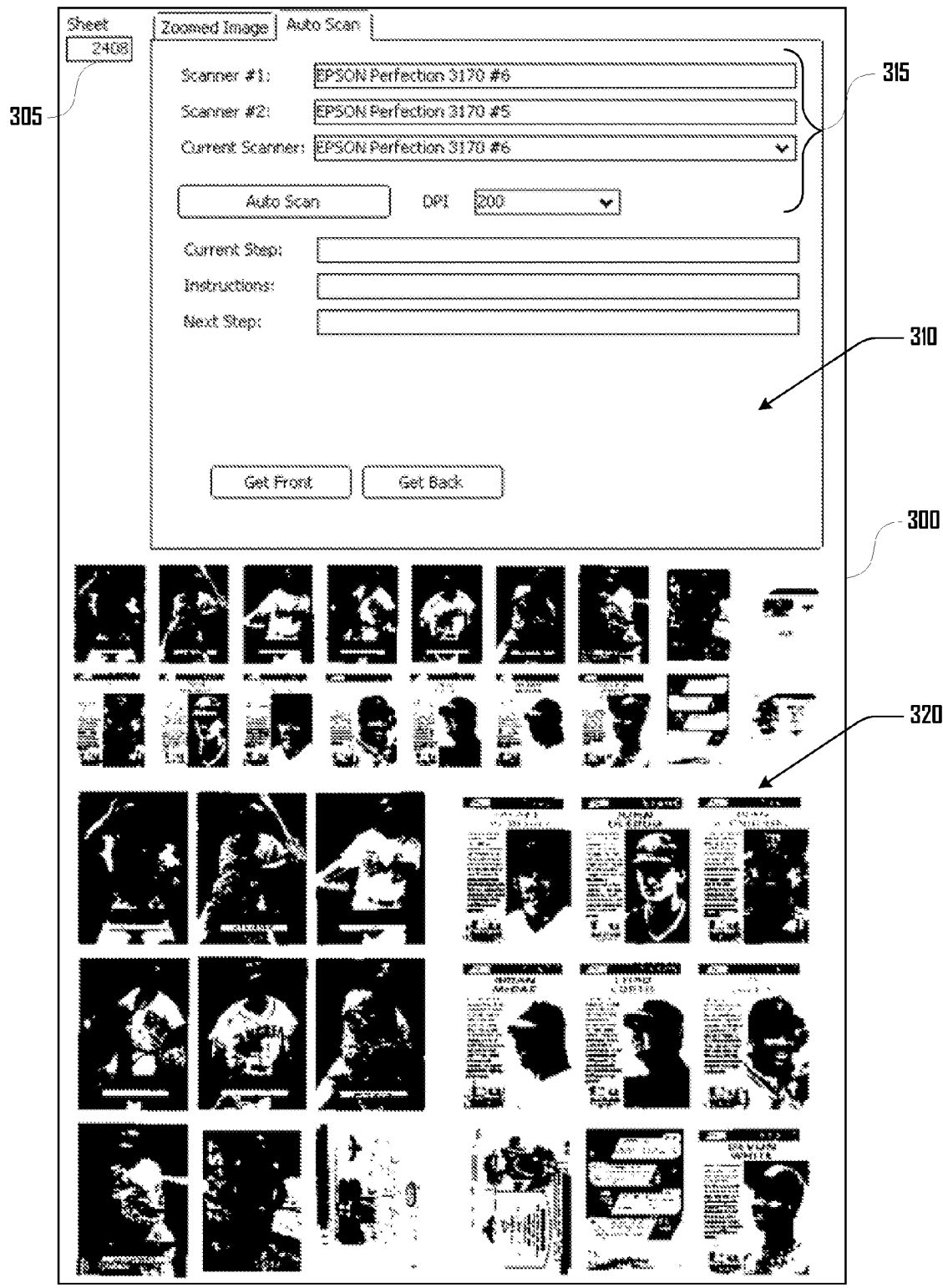
FIG. 3 is an example screenshot of an application that implements gathering images in bulk, in accordance with one embodiment.
Figure 4:
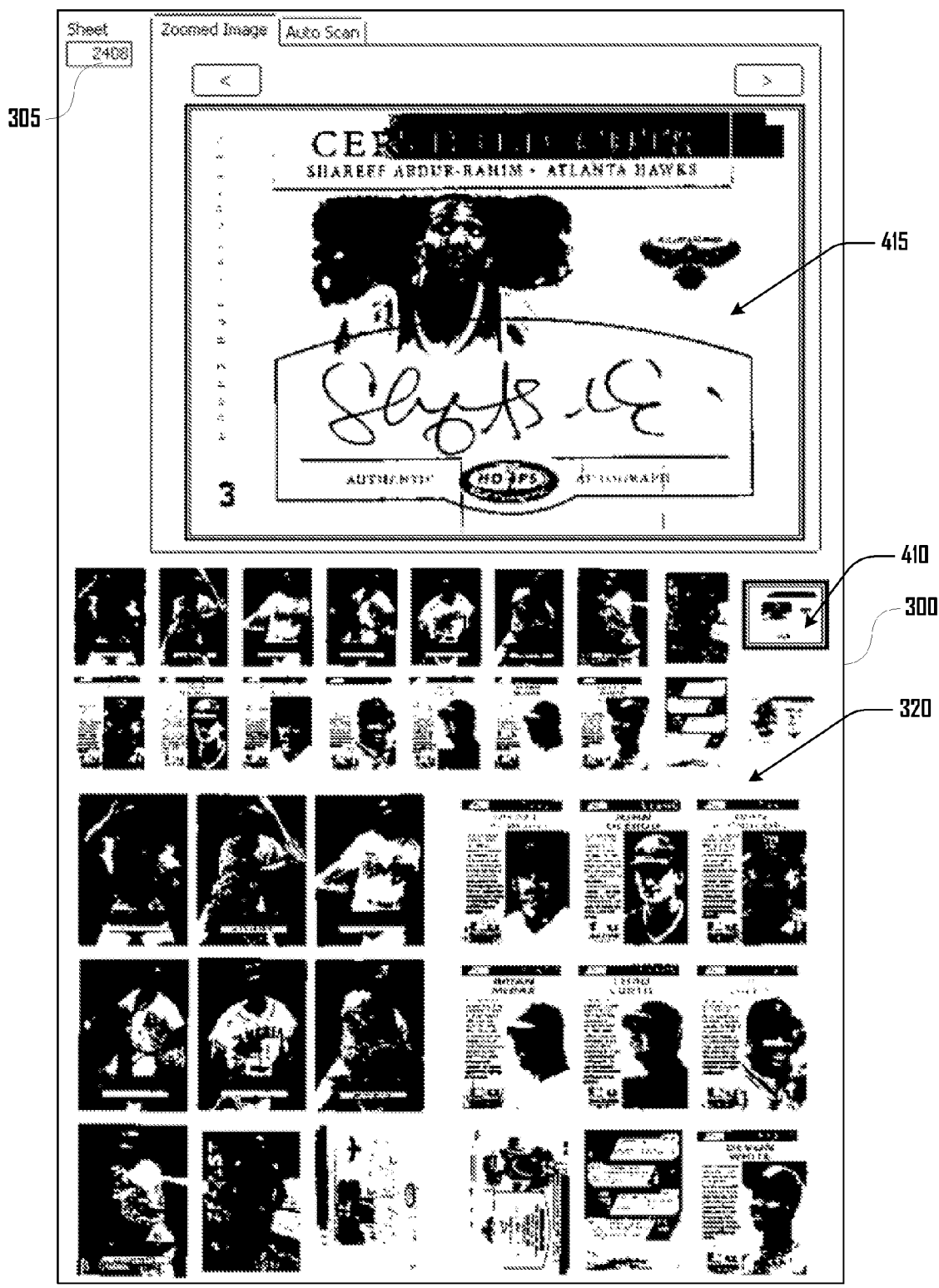
FIG. 4 is another example screenshot of an application that implements gathering images in bulk, in accordance with one embodiment.

FIGS. 3-4 illustrate example screenshots of one example implementation of a software application in accordance with one embodiment. In FIG. 3, the application 300 includes a current sheet identifier 305, indicating a current name/label for a currently displayed sheet 320. Also included is an image source information/control area 310 with image source information 315, for specifying and selecting image source(s) 145.

In FIG. 4, the application 300 also includes an expanded view 415 of a currently selected sub-image 410 from the currently displayed sheet 320.

In embodiments using two or more scanners, the application may have a mode where it will automatically start scanning from a second scanner (not shown) once it has finished scanning in the first scanner 145. This allows the user to flip the sheet in the first scanner 145 or add a new sheet to the first scanner 145 while the second scanner is gathering the image. Similarly, it will start scanning from the first scanner 145 as soon as the second scanner is done. This allows the user to simply insert sheets of items in scanners, flip the sheets, remove the sheets and insert new sheets. The result is a set of sub-images (possibly front and back associated) of each individual item named as the user chose.

Note: The manual inserting, flipping, and removing of sheets could be replaced by a sheet-fed scanner. At present, there are few automatic sheet-fed scanners on the market that do not bend the sheets. The ones that do not bend the sheets are generally more expensive than flat bed scanners that have to be manually fed. While a sheet-fed scanner may be desirable, the benefits from various embodiments also apply to manually fed scanners as well.

Once the sub-images have been saved, the system allows the user to flip through the images and attach extra data to the images, or it can automatically (or manually) attach data to a set of images.

Images may be gathered in bulk by capturing images from image sources and extracting sub-images. The sub-image extraction can happen immediately after the image is captured, or it may be done later, or even a different computing device can do it.

Image sources 145 may include digital image capturing devices such as scanners, digital cameras, video cameras, web cameras or the like. Image sources may also include existing images stored in a file system, database or the like. In these cases, the act of "capturing" may simply be loading a file. This technology can leverage one or more image sources. Increasing the number of image sources may increase the speed at which images can be gathered.

The concept of templates may be used to track information about how to perform different actions. Below is a list of example templates that will be referred to later. Under each template is a list of example information that may be used. The information may not need to include everything listed below and is not limited to what is listed below.

Sub-image Extraction Template 165:
Size and location of the sub-image
Number of degrees to rotate the sub-image
File and folder naming convention for the sub-image
Minimum file size of the sub-image
Image Capture Template 160:
Size and location of the image to capture
Number of degrees to rotate the captured image
File and folder naming convention for the captured image
Set of Sub-image Extraction Templates 165
Image Capture Sequence Template (not shown):
Sequence of image sources
Sequence of Image Capture Templates 160 each with a set of Sub-Image Extraction Templates 165

Figure 5:
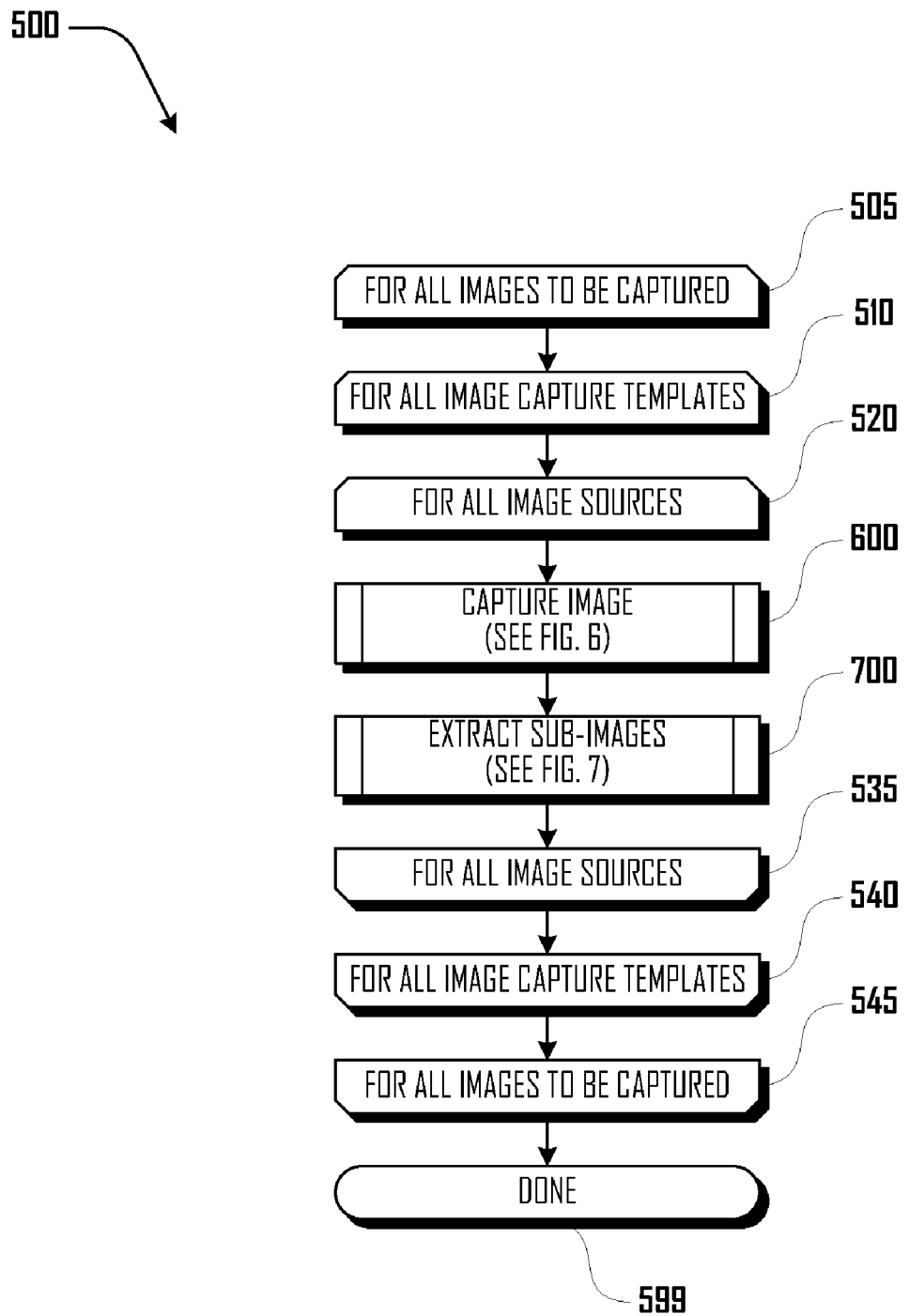
FIG. 5 illustrates a flow diagram of an exemplary routine applying an image capture sequence template, in accordance with one embodiment.

FIG. 5 illustrates a logic flow diagram for an exemplary way of executing an image capture sequence template. The process begins with looping block 505, which iterates until no more images (possibly only a single image) are available. Next, in looping block 510, an iteration begins for each image capture template (possibly only one) in a sequence of image capture templates. A set of sub-image extraction templates 165 may be included in each image capture template 160. These may be the same or they may be different for each image capture template.

In looping block 520, an iteration begins for each image source 145 in a sequence (possibly only one) of image sources. Next, in subroutine block 600, illustrated in FIG. 6 and described below, an image is captured from the image source 145. The image has sub-images extracted in subroutine block 700, illustrated in FIG. 7 and described below.

Next, in looping block 535, the image capturing routine 500 cycles back to block 520 until all image sources have been iterated through. In looping block 540, the image capturing routine 500 cycles back to block 515 until all image capture templates have been iterated through. In looping block 545, the image capturing routine 500 cycles back to block 510 until all images have been iterated through. After which, the image capturing routine 500 ends at block 599.

Note: Other looping orders may be used in alternate embodiments. For example, looping block 510 and looping block 520 (and their corresponding looping blocks 535 and 540) could be interchanged. This will cause the entire sequence of image capture templates to be applied before going to the next input device.

At some point while applying a template sequence, the user may be allowed to pause or stop the sequence. If they choose to stop while in the middle of a sequence, they may be offered the option of completing the image capture sequence(s) currently in progress without using more of the image sources in the image source sequence.

Figure 6:
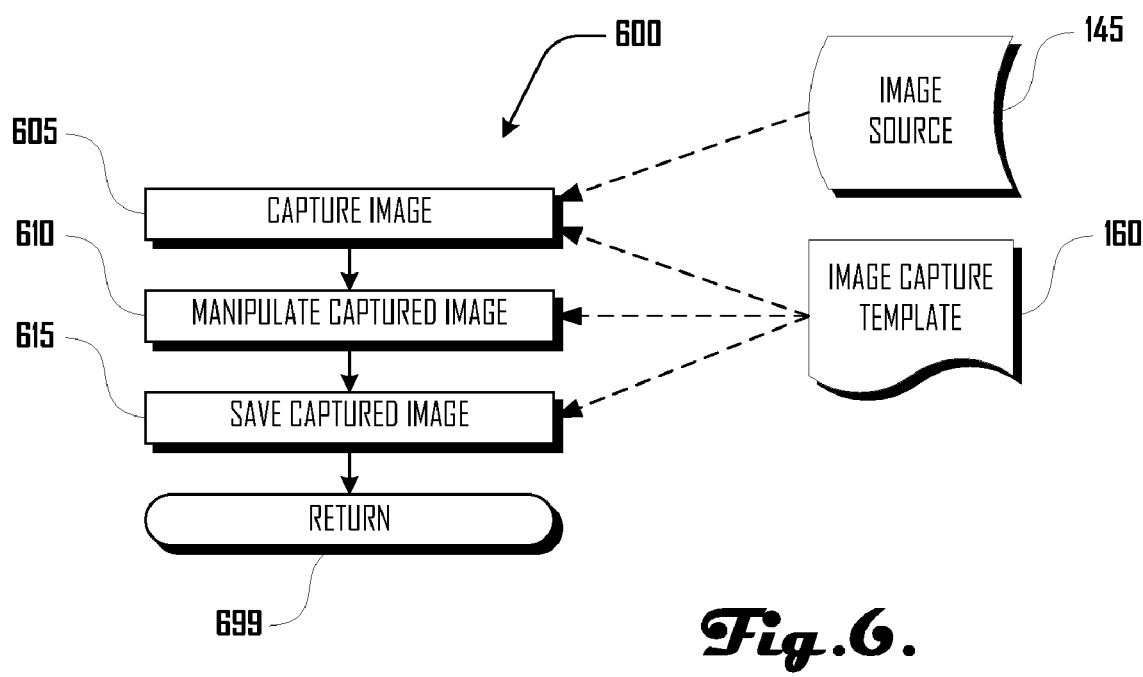
FIG. 6 illustrates a flow diagram of an exemplary subroutine for applying an image capture template to an image source, in accordance with one embodiment.

FIG. 6 illustrates a logic flow diagram for an exemplary subroutine 600 for applying an image capture template 160 to an image source 145. The process starts with operation 605 where the image source 145 is instructed to capture an image based on the information from the image capture template 160. This may include the size and location of the image. This may include the resolution or image quality to use.

Continuing to operation 610, the captured image may be manipulated based on the information in the image capture template 160. This may include the number of degrees to rotate the image. This may include a portion of the image to crop out. This may include a watermark to place on the image. This may include the software making manipulations based on analyzing the image (e.g., finding borders and cropping the image based on that).

Continuing to operation 615, the captured image and/or any of the manipulated images may be saved based on information from the image capture template 160. This may include file and folder naming conventions if the images are to be stored in a file system, or this may include other metadata information if the images are to be stored in a database 170.

Alternately, subroutine 600 may elect not to save the images and simply pass one or more of the images directly to the sub-image extraction step.

Subroutine 600 ends at block 699 and returns to its calling routine.

Figure 7:
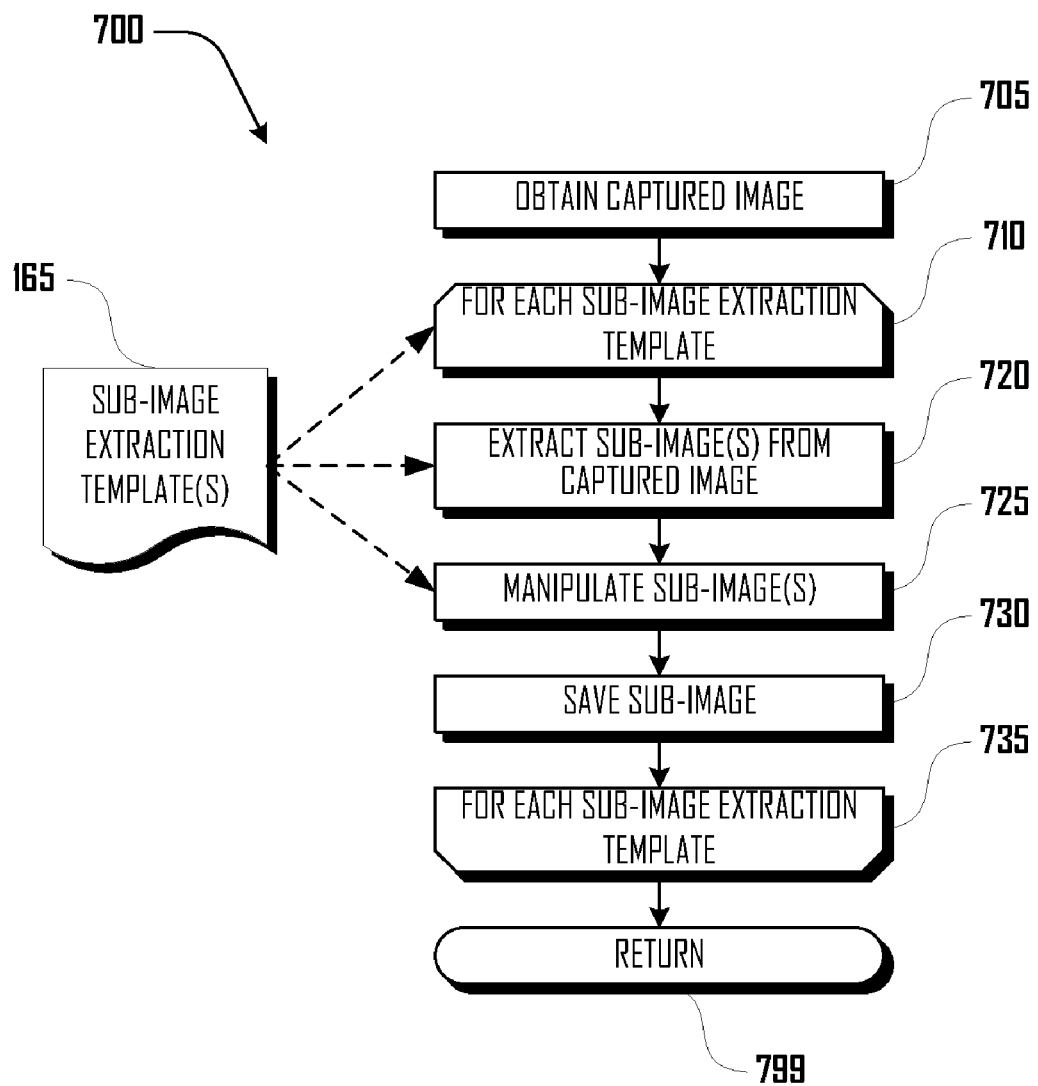
FIG. 7 illustrates a flow diagram of an exemplary subroutine for applying a set of sub-image extraction templates to an image, in accordance with one embodiment.

FIG. 7 illustrates a logic flow diagram for an exemplary subroutine 700 for applying a set of sub-image extraction templates 165 to an image. A set of sub-images may be extracted from the captured image based on the set of sub-image extraction templates defined in the current image capture template 160.

The sub-image extraction process starts with operation 705 where an image may be obtained.

Continuing to looping block 710, subroutine 700 iterates through each specified sub-image extraction template 165 in accordance with the current image capture template 160. There may be a variety of ways to iterate through a set of sub-image extraction templates 165. In this example, the set is enumerated from first to last.

Continuing to operation 720, sub-images may be extracted from the captured image based on information from the sub-image extraction template 165. This may include the size and location of the sub-image. This may deem the entire image as the "sub-image."

Continuing to operation 725, the extracted sub-image may be manipulated based on information from the current template. This may include the number of degrees to rotate the image. This may include a zoom or scale factor for creating thumbnails. In some embodiments there may be no manipulations.

Continuing to operation 730, the original sub-image(s) and/or any of the manipulated sub-image(s) may be saved based on information from the current template. This may include file and folder naming conventions if the sub-images are to be stored in a file system, or this may include other information if the sub-images are to be stored in a database 170. This may also elect not to save one or more of the sub-images. This may be because the sub-image did not satisfy a minimum file size that was specified in the template indicating that the sub-image location was blank. This may also elect not to save the image based on additional analysis on the image to determine if it should be saved.

Continuing to looping block 735, processing cycles back to looping block 710, until there are no more sub-image extraction templates in the set of sub-image extraction templates. If there is not, processing proceeds to block 799 where subroutine 700 returns to its calling routine.

In another embodiment, more than one user device 100 may be used to capture images and/or extract sub-images from the same set of objects. For example, one computer may capture the front of an object, while another computer may capture the right side of an object, while another computer may capture the left side of an object, while another computer may capture the back of an object.

In further embodiments, a computing device may be able to instruct multiple image sources to capture images simultaneously. For example, a computer may be able to instruct six digital cameras to capture images of an object all at one time. The resulting images may then be processed by that computing device or other computing devices.

In yet another embodiment, a single image source may be able to capture multiple images at one time. For example a duplex scanner may be able to scan both the front and back of a page at the same time.

In still further embodiments, a computing device may extract additional information from the images. This may include information gathered by reading barcodes, using optical character recognition, using pattern recognition or the like.

In yet further embodiments, additional information or metadata may be tagged on the images or stored with the images. This may include information from a template, information extracted from the image, information entered by the user, or the like.

In still another embodiment, the size and locations of one or more items may be automatically detected and may not need to be stored in a template. In addition, the orientation may be automatically detected allowing rotation to be done without needing to store that information in a template. Similarly, other aspects of an item may be automatically detected allowing actions to be taken without information being stored in a template.

In yet another embodiment, the sub-images may be processed to locate symbolic information (text, characters, words, names, logos, symbols, color schemes, and the like) for categorization and/or identification purposes. For example, if the words "baseball" and "Yankees" were recognized from a sub-image, the sub-image may be categorized with appropriate metadata such as:

Card type: baseball

Team name: Yankees

Of course, additional metadata may be gathered in additional embodiments.

In further embodiments, after sub-images are extracted, they may be compared with known images that already have associated metadata such that the same or similar metadata is applied to substantially identical cards (however, condition information may be applied on a card-by-card basis).

Additional embodiments may allow for the creating of inventories as sub-images are stored, such that a given merchant or object owner may keep track of how many objects (with sub-images) they possess at a given time. This may be accomplished during the sub-image extraction process or at another point when metadata is associated with an object. In some instances, metadata may be obtained before a sub-image image is obtained. For example, when a user enters the information manually ahead of time. In some embodiments, physical characteristics, including serial numbers, bar codes, 2D bar codes, text and symbols on the object or the like may be used to look up metadata associated with an object.

In still additional embodiments, the database 170 may be searched for information about sub-images and their associated objects. For example, if a scanned image is of a sheet of held objects that are coins, it would be possible to query the database for information related to the previously captured sub-images of the coins. Some queries may relate to the metadata associated with the sub-images, while other queries may be invoked from a subsequent image capture of a previously capture object. In such an example, a user may submit an image of a coin and generate a query asking if any of the sub-images in the database 170 are similar.

Accordingly, in one example implementation, the inventory may be used to associate similar objects, and to located appropriate holders for placing an object that may be a duplicate, in a set with, or otherwise associated with, already placed objects.

Although specific embodiments have been illustrated and described herein, it will be appreciated by those of ordinary skill in the art that a wide variety of alternate and/or equivalent implementations may be substituted for the specific embodiments shown and described without departing from the scope of the present invention. This application is intended to cover any adaptations or variations of the embodiments discussed herein.

The invention claimed is:

1. A computer implemented method of imaging a plurality of individual items that are respectively stored in a plurality of individual storage positions of a multiple-item holder object, each of the plurality of individual items having a first information-bearing side and a second information-bearing side, the multiple-item holder object positioning the plurality of individual items to facilitate gathering images of the plurality of individual items in bulk, the method comprising:

digitally capturing, by an image-gathering computing system, a first image of a first side of the multiple-item holder object, said first image depicting the first information-bearing sides of the plurality of individual items stored in the multiple-item holder object;

extracting, by said image-gathering computing system, a first sub-image from said first image in accordance with a sub-image extraction template, said first sub-image depicting the first information-bearing side of one of the plurality of individual items stored in one of the plurality of individual storage positions of the multiple-item holder object, said sub-image extraction template indicating at least a size and a location of the first sub-image;

associating, by said image-gathering computing system, first position-related metadata to said first sub-image, said first position-related metadata indicating a position of said one of the plurality of individual storage positions at which said one of the plurality of individual items is stored in the multiple-item holder object; and digitally capturing, by said image-gathering computing system, a second image of a second side of the multiple-item holder object, said second image depicting the second information-bearing sides of the plurality of individual items stored in the multiple-item holder object.

2. The method of claim 1, further comprising extracting a second sub-image from said second image in accordance with said sub-image extraction template, said second sub-image depicting the second information-bearing side of said one of the plurality of individual items stored in said one of the plurality of individual storage positions of the multiple-item holder object.

3. The method of claim 2, further comprising associating second position-related metadata with said second sub-image, said second position-related metadata indicating said position of said one of the plurality of individual storage positions at which said one of the plurality of individual items is stored in the multiple-item holder object.

4. The method of claim 2, further comprising associating said first sub-image and said second sub-image.

5. The method of claim 4, further comprising identifying a first held object as said one of the plurality of individual items stored in said one of the plurality of individual storage positions of the multiple-item holder object.

6. The method of claim 5, wherein identifying said first held object comprises comparing said first sub-image with a database of known objects.

7. The method of claim 6, wherein identifying said first held object further comprises comparing said second sub-image with the database of known objects.

8. The method of claim 5, wherein identifying said first held object comprises recognizing symbolic information from at least one of said first sub-image and said second sub-image.

9. The method of claim 8, wherein said recognizing said symbolic information comprises comparing a portion of one of said first sub-image and said second sub-image to a database of known symbols.

10. The method of claim 1, further comprising extracting sub-images corresponding to a second held object.

11. The method of claim 10, further comprising associating said first held object and said second held object.

12. The method of claim 11, further comprising determining association between a plurality of held objects.

13. The method of claim 11, further comprising locating a desirable location for placing a held object based upon association between known held objects.

14. The method of claim 1, further comprising creating an inventory of held objects.

15. The method of claim 1, further comprising capturing object-identifying information from the multiple-item holder object.

16. The method of claim 15, wherein said object-identifying information comprises at least one of a bar code, 2D bar code, text, symbols, and the composition of a plurality of sub-images extracted from the multiple-item holder object.

17. A computing apparatus, comprising a processor and a memory having computer-executable instructions, which when executed, perform the method of claim 1.

18. A non-transitory computer readable storage medium, containing computer-executable instructions for performing the method of claim 1.

* * * * *